FERROELECTRIC INSULATED GATE FIELD EFFECT DEVICE

Filed Sept. 12, 1967

INVENTORS
STUART S. PERLMAN and
ROBERT S. SILVER

BY W. S. Hill
Agent

INVENTOR
STUART S. PERLMAN and
ROBERT S. SILVER
BY W. S. Hill
Agent

United States Patent Office 3,450,966

Patented June 17, 1969

3,450,966
FERROELECTRIC INSULATED GATE FIELD EFFECT DEVICE

Stuart S. Perlman, Princeton, and Robert S. Silver, Kendall Park, N.J., assignors to Radio Corporation of America, a corporation of Delaware Filed Sept. 12, 1967, Ser. No. 667,202
Int. Cl. H01l 11/14
U.S. Cl. 317—235 10 Claims

ABSTRACT OF THE DISCLOSURE

An adaptive semiconductor resistor of the insulating ferroelectric gate type comprising a body of single crystal ferroelectric material such as barium titanate, including an inner core having semiconducting properties and an outer shell having insulating properties, two spaced electrodes in contact with the core defining the ends of a current path through the core, and at least one metallic gate electrode on one or more portions of the shell overlying the current path. The resistance of the device is controlled by varying the polarization of that portion of the ferroelectric outer shell which is beneath the gate electrode (or electrodes) so that the current path has a greater or lesser number of charges induced therein.

A method of making the device, which includes reducing an entire body of ferroelectric material to convert it to a semiconducting state and oxidizing an outer shell portion back to its insulating state, is also disclosed.

BACKGROUND OF THE INVENTION

Solid state electronic circuit elements are presently available in the form of diodes and three-terminal active devices for amplification, generation, and switching, as well as in the form of such classical circuit components as resistors and capacitors. However, it is also desirable to perform other functions which have not previously been performed satisfactorily by solid state devices. In such a category fall those functions which require the device to adapt its characteristics in response to such inputs as voltage or current.

A device having an electrical resistance, which is adaptable over a sizeable range, by the application of a short duration electrical "setting" signal, is currently of interest for applications such as memory, storage, counting and switching circuitry. A more specific application is in "all-electronic" tuning of TV receivers. Such a device, with a sufficiently large number of stable states, can be applied through a suitable loading circuit to a voltage dependent capacitance for selection of various frequencies, or to a voltage dependent gain circuit for volume control in a home instrument or other apparatus.

Adaptable resistors can also provide a storage capability. Once the resistor is placed in the desired state, all power may be turned off. When readout is desired, voltage is applied to the proper electrodes and non-destructive readout is achieved.

An adaptive element should have the following properties:

(a) Broad range adjustment of the transfer characteristic.
(b) Frequency independent transfer characteristic.
(c) Analogue states for the transfer characteristic.
(d) Ability to switch states rapidly.
(e) Low switching power requirements.
(f) Simple switching circuitry.
(g) Ability of device to maintain state in the absence of applied power.
(h) Non-destructive and/or continuous sensing of state.
(i) High speed sensing of state.

(j) Stability of state with time and ambient conditions.
(k) Compatibility with semiconductor devices and integrated circuitry.
(l) Simple fabrication.

A number of approaches have previously been made to the problem of providing adaptive devices. One of these was the Flexode, which utilized field-induced motion of ions in a solid in switching from a diode state to a resistance state. However, the ion motion is too slow for many purposes and the process of ion motion also requires relatively large switching power which tends to elevate device temperature during the switching process.

Another type of adaptive device employed a ferroelectric crystal substrate and a thin evaporated film of semiconducting material on the substrate to serve as a resistor. The ferroelectric crystal substrate also served as a gate insulator. Source and drain electrodes were connected to the ends of the semiconductor film. Spontaneous polarization of the ferroelectric gate material served to control the density of free charges, and thus the conductivity of the resistor. This device satisfied nearly all of the requirements which have been listed above as desirable properties for an adaptive element. It had high resistance ratios of at least 1,000 to 1. It was frequency independent up to high frequencies. Its resistance could be adjusted to any intermediate arbitrary value through partial switching to intermediate values of polarization of the ferroelectric material. Its switching time was of the order of microseconds. And it required low switching power of the order of milliwatts. It had the disadvantage, however, that the stored state of the device decayed slowly with time and it was adversely influenced by ambient conditions. Although these electrical instabilities can be dismissed in some circuit applications, it would be desirable to have a device in which they are absent.

A modification of the ferroelectric field effect adaptive devices uses a thin-film, insulated-gate, field-effect transistor on the ferroelectric crystal substrate instead of the thin-film resistor. In this device, the spontaneous polarization of the ferroelectric material serves to modulate the channel conductivity, and thus the transfer characteristic of the transistor. The properties of the device are essentially the same as those of the thin-film ferroelectric gate resistor, taking into consideration the difference in the characteristic form of the resistor as compared to a family of curves corresponding to the transfer characteristic of the thin-film transistor. Pinch-off voltage of the transistor is adaptable over a sizeable range. In terms of transconductance or gain of the transistor, changes in excess of 1,000 to 1 have been shown for maximum positive and maximum negative values of remanent polarization on the ferroelectric gate material.

It would be desirable to have a ferroelectric field effect type adaptive device in which the electrical instabilities observed in previous devices have been reduced or totally eliminated.

OBJECT OF THE INVENTION

It is a principal object of the present invention to provide an improved adaptive solid state electronic circuit element having all of the advantages of previously-known ferroelectric field-effect type devices but having much improved stability.

A further object is to provide a process of making an improved adaptive solid state electronic circuit element of the ferroelectric gate type in which causes of electrical instability have been largely eliminated.

SUMMARY OF THE INVENTION

One aspect of the present invention is an improved, adaptive, solid-state electronic device of the insulating ferroelectric gate type, which comprises a body of single crystal ferroelectric material, including an inner core having semiconducting properties and an outer shell having insulating properties, two spaced electrodes in contact with the core defining the ends of a current path through the core, and at least one metallic gate electrode on one or more portions of the shell overlying the current path. The resistance of the device is controlled by varying the polarization of that portion of the ferroelectric outer shell which underlies the gate electrode (or electrodes) so that the semiconducting part which constitutes the current path has a greater or lesser number of charges induced therein. The number of charges in the current path determines the resistance to current flow. Stable states of operation are achieved by completely polarizing the ferroelectric positively or negatively, and intermediate states can be obtained with incomplete polarization.

Another aspect of the invention is a method of making an adaptive semiconductor device of the insulating ferroelectric gate type which comprises providing a body of single crystal insulating ferroelectric material, such as barium titanate, converting the entire body material to a form having semiconducting properties, as by a reduction process, and reconverting an outer shell, only, of the body to its previous insulating state. The device may be completed by providing the core portion with a pair of spaced electrodes which are to define the ends of a current path through the semiconductor core portion, and depositing one or more metal films on parts of the ferroelectric insulating outer shell overlying the current path, in order to form one or more gate electrodes.

DRAWINGS

PREFERRED EMBODIMENT

An important condition in the design of a bulk or a thin-film ferroelectric field-effect device with a large ratio of "on" to "off" channel conductivity is that the number of charges induced in the channel region by the maximum spontaneous polariaztion of the ferroelectric gate material be nearly equal to the number of equilibrium charges which are present in the semiconductor in the absence of the field. Then, the "on" conducitivity of the channel would be twice the equilibrium conductivity and the "off"

conductivity would be essentially zero. Thus, optimum device design requires that $$Q_f wL \approx qNwLh \tag{1}$$

or $$Nh \approx Q_f / q \tag{2}$$

where

N=number of electrons in the channel (cm.$^{-3}$)
$q$N=equilibrium channel charges (C/cm.$^3$)
$w$=channel width (cm.)
L=channel length (cm.)
$h$=channel height (cm.)
$Q_f$=induced charges due to polarization field (C/cm.$^2$)

Optimum design depends on the N$h$ product and not on $w$ or L. These latter variables can be arbitrarily selected to obtain the desired equilibrium resistance ($R_o$):

$$R_o = (1/Nq\mu)(L/wh) \tag{3}$$

where $\mu$ is the mobility of the free carriers in the channel.

Switching characteristics of the adaptive resistor depend on the switching properties of the particular ferroelectric host material. A gate voltage pulse of sufficient amplitude can reverse the polarity of the polarization field in times measured in microseconds. For example, a 10 volt pulse to a gate electrode of an adaptive resistor with a 2 mil thick barium titanate ($BaTiO_3$) gate insulator will switch the polarization state in less than 1 $\mu$s.

The useful range of operating temperatures for the adaptive resistor depends mainly on the Curie temperature of the particular ferroelectric material used. Above this temperature the material loses its ferroelectric properties. A large number of ferroelectric materials are available with Curie temperatures covering a wide range. Barium titanate, with a Curie temperature of approximately 120° C., is particularly suitable as a material for adaptive resistors for room temperature circuit applications.

Figure 1:
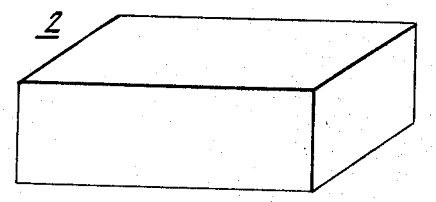
FIGURE 1 is a perspective view of a body of insulating ferroelectric material suitable for making a device of the present invention.
Figure 2:
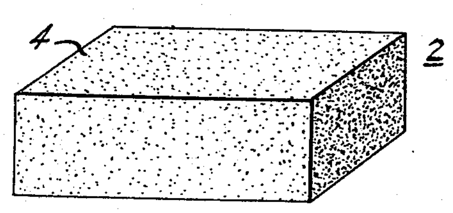
FIGURE 2 is a similar view of the body of FIGURE 1 after it has been converted to a semiconducting form.
Figure 3:
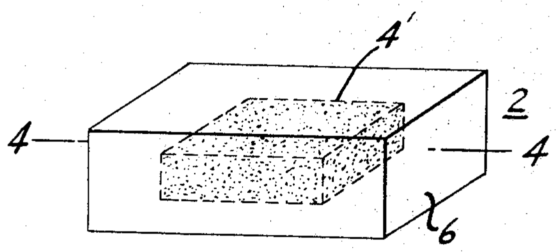
FIGURE 3 is a view similar to that of FIGURES 1 and 2 of the same body after an outer shell has been reconverted to insulating form.
Figure 4:
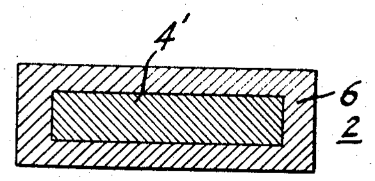
FIGURE 4 is a cross-section view taken along the line 4—4 of FIGURE 3.

An example of fabrication of a device in accordance with the invention will now be given. A suitable starting material in making a device of the invention is a single crystal platelet 2 (FIG. 1) of oxidized insulating barium titanate. Suitable bodies are commercially available although they may not have the geometrical form illustrated. As illustrated in FIG. 2, the body is completely reduced to a semiconducting state 4' by heating in a hydrogen atmosphere at a temperature of 600°–900° C. for 12–17 hrs. This is believed to produce a form of the material having oxygen vacancies. It is now N-type semiconducting throughout. Visible evidence of the reduction is a change of color from plate yellow to dark brown. As illustrated in FIG. 3, an outer shell 6, 1–4 mils thick, of the converted body of material 4' illustrated in FIG. 2 is reconverted back to ferroelectric insulating form by reoxidizing. The reoxidization step is accomplished by heating in air at 700° C. for a few minutes. Visible evidence of the reconversion is a change in color from dark brown back to pale yellow.

Methods of reduction and oxidation, other than those mentioned above, can also be used, and times and temperatures of the process can be varied to obtain different device characteristics.

Figure 5:
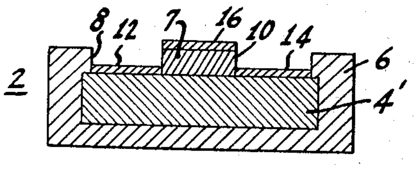
FIGURE 5 is a view similar to that of FIGURE 4 showing a further step of processing in the manufacture of a device of the invention.

Referring to FIGURE 5, two openings 8 and 10 spaced close together on one face of the crystal are formed by suitable masking, and etching with phosphoric acid through the insulating outer shell down to the semiconducting core. Next, films of magnesium 12 and 14 are deposited on the core material 4' at the bottoms of the openings 8 and 10, respectively. These films may be deposited by evaporation in vacuum. A film of gold is then deposited over the magnesium film and the films are sintered at about 400° C. in a neutral atmosphere, for example, nitrogen.

Again, by suitable conventional masking techniques, a gate electrode 16, in the form of a thin film of gold, is deposited by evaporation on that part 7 of the insulating layer 6 between the etched openings 8 and 10.

Figure 6:
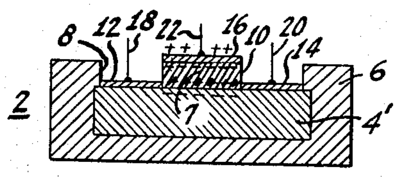
FIGURE 6 is a view similar to that of FIGURE 5 with electrode leads attached to the device and illustrating its mode of operation.

As shown in FIGURE 6, electrical lead wires 18, 20 and 22 may be attached by soldering or bonding to electrodes 12, 14 and 16, respectively.

Referring to FIGURE 6, the portion of the semiconducting core 4' between the electrodes 12 and 14 functions as the current path of the device. By increasing the number of majority charge carriers in this current path, the resistance of the current path is decreased and the amount of current carried in response to a given difference in potential between the two electrodes 12 and 14 is correspondingly increased. As the number of charge carriers in the current path or channel is decreased, resistance in the path is increased and current carrying capacity is reduced.

Figure 8:
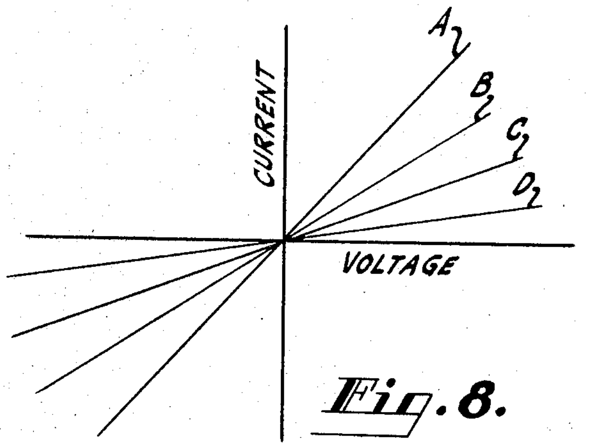
FIGURE 8 is a family of current-voltage curves applicable to the device of FIGURES 5 or 6.

In operating the device which has been described, for example, if a positive pulse of sufficient magnitude to completely switch the ferroelectric is applied to the gate electrode 16, the device will be switched to its maximum "ON" state and have a current-voltage characteristic as shown by the curve A of FIGURE 8. As the potential between the source and drain electrodes is increased, increased current flows in the resistor. If a voltage pulse of sufficient magnitude of the opposite polarity is then applied, the ferroelectric body portion is polarized in the opposite direction so that + charges are induced in the channel and the device is switched to its maximum "OFF" state with the characteristic shown by curve D of FIGURE 8.

If voltage pulses of magnitude less than that required to completely switch the ferroelectric are applied to the gate electrode, intermediate states are achieved as indicated by curves such as B and C of FIGURE 8.

The device of the present invention uses a single material of continuous crystalline structure for both the ferroelectric and the semiconducting portions. Moreover, the semiconductor portion is completely embedded in and surrounded by the ferro-electric portion. This structure has eliminated free carrier trapping effects formerly associated with the exposed semiconductor surface. It has also eliminated the states which formerly existed at the interface between the semiconductor and ferroelectric.

Although the invention has been illustrated using barium titanate as the material for both ferroelectric and semiconductor, other well known ferroelectric materials of the perovskite oxide type can be used.

Figure 7:
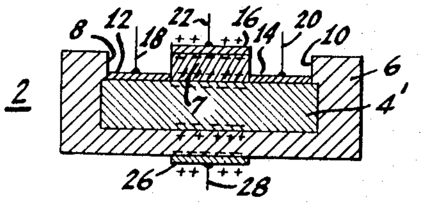
FIGURE 7 is a cross section view showing another embodiment of the device of the invention.

Another embodiment of the present invention is illustrated in FIGURE 7. This device is similar to the device of FIGURE 6 but has a second gate electrode 26 on the surface of the insulating layer 6 directly opposed to the location of the first gate electrode 16. The area of the electrode 26 is the same as electrode 16. The electrode 26 is provided with a lead wire 28.

Figures 9, 10, 11:
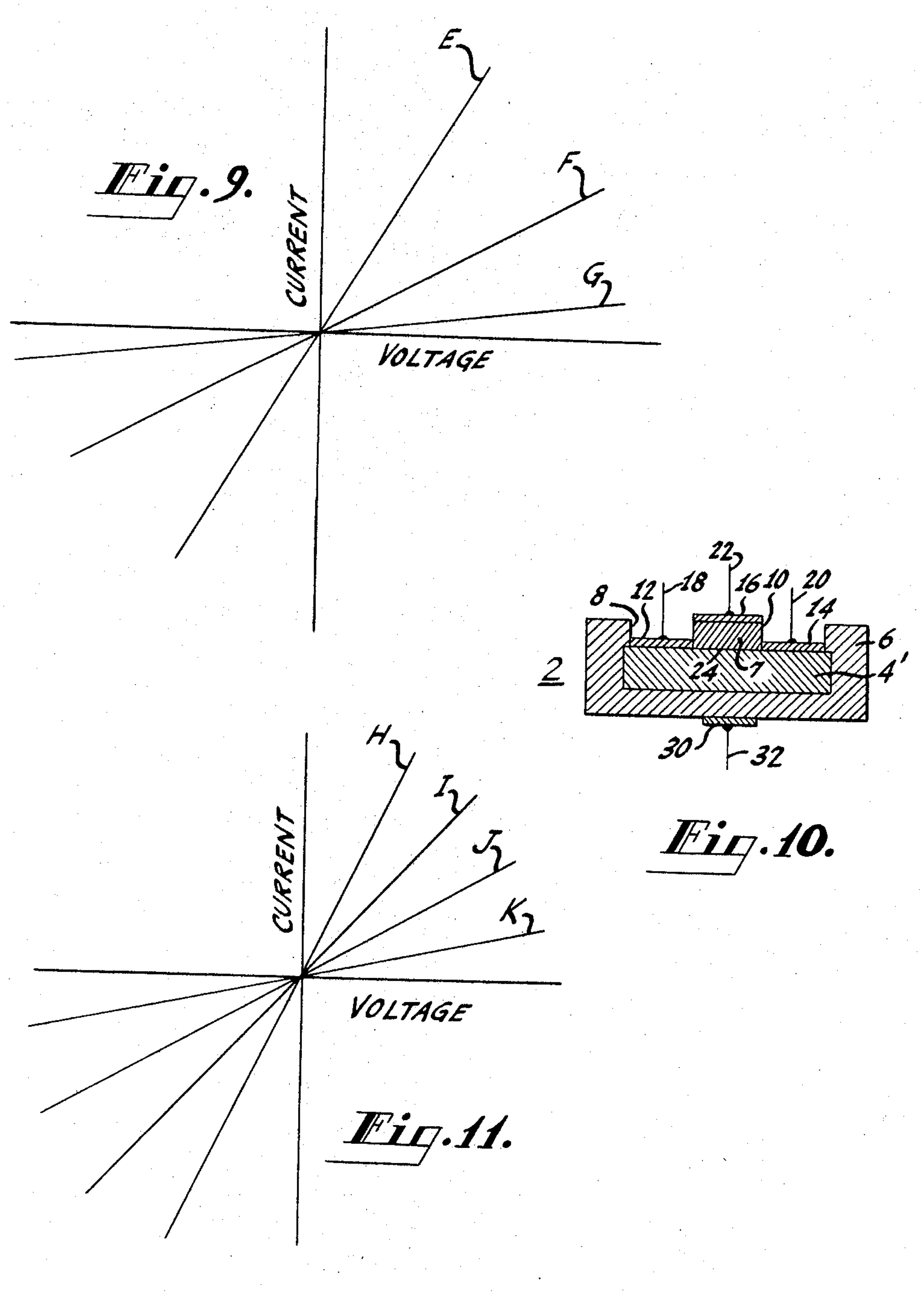
FIGURE 9 is a family of current-voltage curves applicable to the device of FIGURE 7.
FIGURE 10 is a cross-section view showing still another embodiment of a device in accordance with the present invention.
FIGURE 11 is a family of current-voltage curves applicable to the device of FIGURE 10.

Operation of the device of FIGURE 7 is different than the device of FIGURE 6. Assuming that the device is symmetrical and that the gates have an equal control effect, current-voltage characteristics are shown in FIGURE 9. When both gates are pulsed + (in the device illustrated) the characteristic of Curve E is obtained. In this case the channel exhibits maximum conductivity. When both gates are pulsed −, the characteristic of Curve G is obtained. Here the channel has minimum conductivity. With one gate pulsed + and the other −, the characteristic of Curve F is obtained. In this case the channel has a degree of conductivity midway between the states of Curves E and G.

The two-gated, symmetrical device has the advantage over the single-gated device in that it can be used for tertiary memory or logic arrays since each of the three states is a stable, positively established condition, obtained by total switching of the ferroelectric gate material.

The two-gate symmetrical device may also be incompletely polarized to obtain any number of intermediate states.

Still another embodiment of a device in accordance with the invention is shown in FIGURE 10. This form of the device includes a second gate electrode 30 which is less in area than the first gate electrode 16. It could also have an area greater than electrode 16. This device has unsymmetrical control gate electrodes and therefore has four completely stable states of operation illustrated in the family of characteristic current-voltage curves of FIGURE 11, corresponding to the different combinations of maximum + or − polarization of the gate materials.

In the family of characteristic curves of FIGURE 11, Curve H shows the condition with both gates pulsed +. Curve I shows the condition with the more efficient gate electrode (assumed to be the electrode 16 of larger area) pulsed + and the less efficient electrode (assumed to be the electrode 30 of smaller area) pulsed −. Curve J illustrates the condition with the more efficient gate electrode pulsed − and the less efficient gate electrode pulsed +. Curve K illustrates the condition when both gates are pulsed −.

The two gated unsymmetrical device may also be incompletely polarized to obtain any number of intermediate states.

The device of FIGURE 10 is suitable for quaternary logic and memory arrays.

What is claimed is:

1. An electronic device comprising an integral body which includes an inner core of material having extrinsic semiconducting properties, and an outer layer of ferroelectric insulating material susbtantially surrounding said core, two spaced electrodes on the periphery of said core defining ends of a current path through said core, and at least one metallic gate electrode on said layer of insulating material overlying said current path.

2. An electronic device comprising a body of single crystal ferroelectric material including an inner core having semiconducting properties and an outer shell having insulating properties, two spaced electrodes in contact with said core defining the ends of a current path through said core, and a metallic gate electrode on a portion of said shell overlying said current path.

3. A device according to claim 2 in which said core is a reduced form of said material and said shell is an oxidized form of said material.

4. A device according to claim 3 in which said material is barium titanate.

5. An electronic device comprising a body of a single crystalline ferroelectric material including an inner core having semiconducting properties and an outer shell having insulating properties, two spaced electrodes in contact with said core defining the ends of a current path through said core, and two metallic gate electrodes disposed on different portions of said shell overlying opposite sides of said current path.

6. A device according to claim 5 in which said gate electrodes are symmetrical as to their control properties, with respect to each other.

7. A device according to claim 6 in which said gate electrodes are non-symmetrical as to their control properties, with respect to each other.

8. A method of making an adaptive semiconductor device of the insulating ferroelectric gate type comprising:

(a) providing a body of single crystal insulating ferroelectric material, (b) converting all of said body material to a form having semiconducting properties, (c) reconverting an outer shell, only, of said body to its previous insulating state, (d) providing the non-reconverted semiconductor portion of said body with a pair of spaced electrodes which are to define the ends of a current path through said semiconductor portion, and (e) depositing a metal film on at least a part of said outer shell overlying said current path to serve as a gate electrode.

9. A method according to claim 5 in which said body of single crystal insulating ferroelectric material is barium titanate and said conversion step is accomplished by heating in a reducing atmosphere.

10. A method according to claim 6 in which said conversion step is followed by an oxidation step to reconvert said outer shell to its previous insulating state.

References Cited

UNITED STATES PATENTS

| | | | |
|---|---|---|---|
| 2,791,758 | 5/1957 | Looney | 340—173 |
| 2,791,759 | 5/1957 | Brown | 340—173 |
| 2,791,760 | 5/1957 | Ross | 340—173 |
| 2,791,761 | 5/1957 | Morton | 340—173 |

JOHN W. HUCKERT, *Primary Examiner.*

R. SANDLER, *Assistant Examiner.*

U.S. Cl. X.R.

29—571